United States Patent [19]

Takada et al.

[11] 4,451,502
[45] May 29, 1984

[54] METHOD FOR MANUFACTURING MAGNETIC RECORDING MEDIUM

[76] Inventors: Kazuo Takada, 207 Toride; Shinji Umeki, 1113-16 Iwamurata, both of Saku-shi, Nagano-ken, Japan

[21] Appl. No.: 409,952

[22] Filed: Aug. 20, 1982

Related U.S. Application Data

[63] Continuation of Ser. No. 231,865, Feb. 5, 1981, abandoned.

[30] Foreign Application Priority Data

Jan. 28, 1980 [JP] Japan .................................. 55-7812

[51] Int. Cl.³ .............................................. B05D 3/14
[52] U.S. Cl. ...................................... 427/48; 427/128
[58] Field of Search .............................. 427/127–132, 427/48; 428/900

[56] References Cited

U.S. PATENT DOCUMENTS 4,177,442 12/1979 Bate et al. .......................... 335/284

Primary Examiner—Bernard D. Pianalto
Attorney, Agent, or Firm—Wyatt, Gerber, Shoup, Scobey & Badie

[57] ABSTRACT

A method for manufacturing a magnetic recording medium including the steps of applying a magnetic coating containing magnetic particles therein to a support, subjecting said support having the magnetic coating thereon to magnetic orientation treatment while the magnetic coating is still in fluid condition and thereafter drying the magnetic coating, characterized in that said magnetic orientation is effected by passing said support having the magnetic coating thereon through a magnetic orientation field generated from magnetic field generating means which comprises one or more permanent or DC magnets and an array of a plurality of parallel elongated members of a soft magnetic material arranged substantially in a plane close and parallel to said support and adapted to be magnetized by said magnet or magnets.

5 Claims, 9 Drawing Figures

METHOD FOR MANUFACTURING MAGNETIC RECORDING MEDIUM

This is a continuation of application Ser. No. 231,865 filed Feb. 5, 1981, abandoned.

BACKGROUND OF THE INVENTION

The present invention relates to a method for manufacturing a magnetic recording medium and more particularly to a method for subjecting a magnetic recording medium to a magnetic orientation procedure.

The conventional magnetic recording medium is usually comprised of a magnetic coating consisting of magnetic particles dispersed in an organic resin binder and a support therefor such as polyester base. In applying the magnetic coating to the support it is necessary to magnetically orient the easy magnetization axis of magnetic particles in the direction of magnetic recording track. This procedure is well known as the magnetic orientation which is a necessary means for improving the magnetic properties of magnetic recording medium such as the sensitivity, the output, the signal-to-noise ratio (S/N). Among various means for the magnetic orientation, widely used in the art are a DC current magnet and a permanent magnet each of which is adapted to generate a magnetic field in the direction of the recording track of the magnetic recording medium.

However, to meet the recently developed demand for a high quality magnetic tape which has a magnetic coating having a high concentration of magnetic particles in a binder or which utilizes magnetic particles having high remnant magnetic flux, it becomes necessary to use a highly viscous magnetic coating composition, with the result that the magnetic particles are not easily brought into alignment in the direction of the external magnetic field. To overcome this defect, increasing the magnetic field was tried but this resulted in the coagulation of the magnetic particles, leading to an irregular surface of the magnetic coating and a low sensitivity in the high frequency range. Such low sensitivity is especially apparent with those magnetic particles having a large remnants magnetic flux.

BRIEF SUMMARY OF THE INVENTION

Accordingly, a primary object of the present invention is to provide a magnetic orientation method which overcomes the disadvantages of the conventional methods.

Another object of the present invention is to provide a method of manufacturing a magnetic recording medium of a high quality.

Still another object of the present invention is to provide a magnetic orientation method which is particularly adapted to a viscous magnetic coating composition.

The inventors have made an extensive effort to find a solution of overcoming the prior art disadvantages and have discovered that a superior effect is achieved by performing a magnetic orientation in the following manner promptly after a magnetic coating has been applied to a support. In Japanese Application No. 55-7810 the applicants proposed a magnetic orientation method which comprises the steps of preparing a magnet assembly consisting of an array of elongated permanent or DC magnets or equivalent magnets arranged in side-by-side relation in such manner that the pole pieces of the magnets of the same polarity lie substantially in a plane parallel to the support and passing a support having thereon magnetic coating, which has been just applied to the support, through a magnetic field from said pole pieces. The magnetic coating still in fluid condition is subjected to periodical variation in the magnetic field as it advances past the magnet assembly, with the result that the magnetic particles dispersed in the magnetic coating are oriented in the direction of the movement of the magnetic recording medium. The degree of orientation is about 30~40% higher than that obtained by the conventional orientation method.

The reason why the degree of orientation is improved by such method has not been theoretically analyzed but it is evident that this method can contribute to the improvement in the properties of magnetic recording medium.

The present invention relates to the further development of the above-mentioned orientation method.

That is, according to the present invention, the orientation method comprises passing a magnetic recording medium consisting of a support and a undried magnetic coating film applied to the support through a magnetic orientation field generated from a magnetic field generating means which comprises one or more permanent magnets or DC magnets and an array of a plurality of parallel elongated members of a soft magnetic material arranged substantially in a plane close and parallel to the recording medium and adapted to be magnetized by said magnet or magnets. This method is different from the method of the above-mentioned Japanese patent application in that the array of the elongated members are formed from a soft magnetic material but not from a permanent magnet. The advantages resulting from the present method will be made clear in the following.

DETAILED DESCRIPTION OF THE INVENTION

Figure 1A:
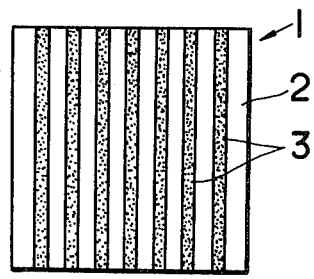
FIG. 1(a) is a plan view of a magnetic orientation means used in the present invention.
Figure 1B:
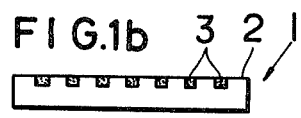
FIG. 1(b) is a front elevational view of the means illustrated in FIG. 1(a)

The present invention will now be fully explained making reference to the accompanying drawings and working examples.

The principle of the present invention will be first explained. As will be explained specifically in the working examples, an array of a plurality of parallel bars 3 of a soft magnetic material such as mild steel or magnetic soft ferrite are embedded in the surface of a non-magnetic supporting plate 2 to form a magnetic orientation means or device 1 for adjusting the magnetic field generated from a pair of permanent or DC magnets 4 and 5. The pole pieces of the same polarity of the magnets 4 and 5 are opposed to each other and the orientation device 1 is inserted between the pole pieces to modify or adjust the magnetic orientation field from the pair of magnets 4 and 5. A magnetic recording medium consisting of a plastic support 6 and a magnetic coating film 7 which has been just applied to the support and is still in fluid condition is passed across the surface of the orientation device 1 between the magnets 4 and 5. In this case, the array of the soft magnetic bars 3 are arranged in a plane close and parallel to the back side of the support 6 and the longitudinal axis of the elongated bars 3 extends generally transversely of the support 6 though other angles may be selected. The soft magnetic bars 3 are magnetized by the magnetic field from the magnets 4 and 5 to modify the magnetic field and give vertical components (with respect to the surface of the magnetic coating film). As the support 6 advances in the direction indicated by the arrow, the magnetic particles dispersed in the magnetic coating film 7 are first oriented or aligned in the direction of the movement of the support 6. Then, as respective magnetic particles advance past the bars 3 they are oriented vertically under the influence of the vertical magnetic field. Again, the magnetic particles are oriented in the direction of the movement of the support. The above processes are repeated several times, whereby the magnetic particles gradually overcome the viscosity of the binder of the magnetic coating and align in the plane of the magnetic coating film. It has been confirmed that the above orientation procedure is much superior to the conventional orientation method in the following aspects and is particularly adapted to the orientation of a highly viscous magnetic coating 1. The structure for modifying the field strength can be freely designed as the soft magnetic material is easy to manufacture.
2. Mild steel or soft iron or ferrite provides a sufficient effect and reduces the cost.

One or a pair of permanent or DC magnet is required to be used together with the array of the bars of soft magnetic material to magnetize the bars. Moreover, as it is sufficient to use a magnetic field strength of 100-500 oe, the conventionally used magnets having pole pieces of the same polarity facing each other or even weaker magnetics may be used. Further, a single magnet may even be used rather than a pair.

The following are working examples.

EXAMPLE 1

Figure 2:
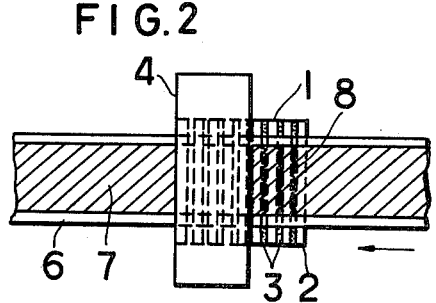
FIG. 2(a) is a plan view explaining the method of the present invention.
FIG. 2(b) is a front elevational view explaining the method of the present invention.
Figure 3:
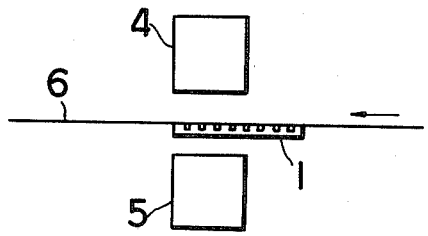
FIGS. 3(a), (b), (c), (d) and (e) are front elevational views showing various positions of the magnetic orientation means.
Figure 3A:
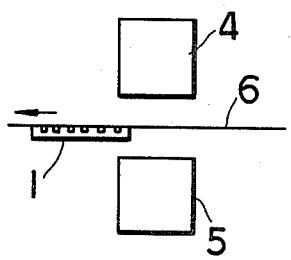
Figure 3B:
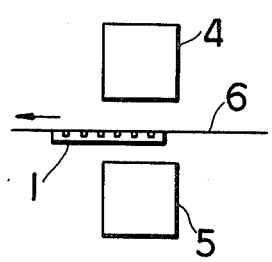
Figure 3C:
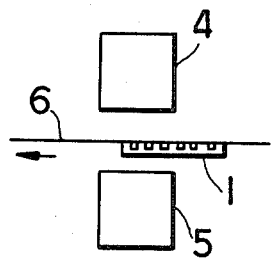
Figure 3D:
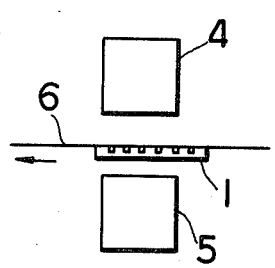
Figure 3E:
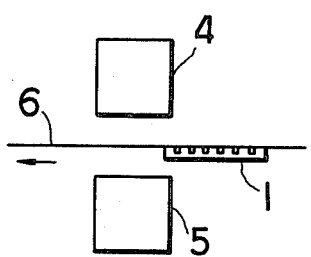

Referring to FIGS. 1(a) and 2, the portion a magnetic orientation device which comprises an array of bars of a soft magnetic material (hereinafter called "array portion" was fabricated in the following manner. A plurality of bars 3 of mild steel (S45C) having rectangular cross section were prepared. A brass plate 2 having a dimension of 150 mm×120 mm×5 mmt was cut to provide a plurality of parallel grooves having a width of 3 mm and a depth of 3 mm at an interval of 3 mm in the direction of the 150 mm length. The bars 3 were fit in the grooves as shown in FIGS. 1(a) and (b) and welded to the brass plate 2. The surface of the thusly formed array portion 1 is ground and polished to provide a flat surface. This array portion 1 was used in combination with a pair of permanent magnets 4 and 5 having opposing pole pieces of the same polarity as shown in FIGS. 2(a) and (b). A plastic support 6 having a magnetic coating 7 thereon which had been just applied to the support 6 and was still in fluid condition was passed between the magnets 4 and 5 along the surface of the array portion 1 with or without a small gap between the lower surface of the support and the upper surface of the array portion 1. The longer (=150 mm) edges of the array portion 1 was longer than the width of the magnetic coating film 7. Several horizontal positions of the array portion 1 were selected as shown in FIGS. 3(a), (b), (c), (d) and (e), respectively, to determine the effect of the positional change of the array portion 1. FIG. 3(a) shows the position where the array portion 1 is almost moved off the left edges of the magnets 4 and 5, FIG. 3(b) is the position where the array portion 1 partically extends left wardly from the magnets 4 and 5, FIG. 3(c) is the position where the array portion 1 is approximately at the middle portion of the magnets 4 and 5, FIG. 3(d) is the position where the array portion 1 is partically extended rightwardly from the magnets 4 and 5 and FIG. 3(a) is the position where the array portion 1 is almost moved off the right edges of the magnets 4 and 5. Also, a specimen was prepared using only the pair of the permanent magnets 4 and 5 (comparative example).

The magnetic recording medium used in the above testings was prepared in the following process. A composition having the following formulation was mixed and dispersed in a ball mill for 48 hours.

| Materials | Parts by weight |
| --- | --- |
| acicularY-Fe$_2$O$_3$(Hc = 388 Oe) | 750 |
| phenoxy resin | 60 |
| poly urethane resin (prepolymer) | 140 |
| polyisocyanate | 100 |
| lauric acid | 6 |
| methylethylketone | 1100 |
| toluene | 1100 |

The resulting magnetic coating material was applied to a 12μ-thick polyester film at a speed of 60 meters per minute to form a magnetic coating film having a dry thickness of about 6μ. The coated film was then passed through the magnetic field formed by the magnets and the array portion in either one of the positions of FIGS. 3(a) through (e). The magnetic field strength at the center of the gap between the magnets 4 and 5 was set at 1,500 oe. The film having the oriented magnetic coating was then passed through a drying furnace, calendered and cut into magnetic tapes of a width of 3.81 mm.

The magnetic tapes were tested and various properties were listed in Table 1.

TABLE 1

| Experiment No. | 1 | 2 | 3 | 4 | 5 | Comparative Example |
| --- | --- | --- | --- | --- | --- | --- |
| Position of the array portion 1 | FIG. 3(a) | 3(b) | 3(c) | 3(d) | 3(e) | none |
| Coercive force Hc(oe) | 360 | 363 | 367 | 366 | 364 | 354 |
| Degree of orientation Br∥/Br⊥ | 2.7 | 2.8 | 3.0 | 2.9 | 2.8 | 2.0 |
| Squereness Br/Bm ratio | 0.85 | 0.86 | 0.89 | 0.88 | 0.87 | 0.80 |

TABLE 1-continued

| Experiment No. | 1 | 2 | 3 | 4 | 5 | Comparative Example |
|---|---|---|---|---|---|---|
| Sensitivity at 16 KHz(dB) | +1.5 | +1.8 | +2.1 | +2.0 | +1.7 | 0 |
| Bias noise (dB) | −0.8 | −1.0 | −1.1 | −1.1 | −0.9 | 0 |
| Saturated output at 333 Hz | +0.8 (dB) | +0.9 | +1.1 | +1.0 | +0.8 | 0 |

As is clear from Table 1, the degree of orientation attained by the method of the present invention (working example) was enhanced by about 40~50% over the conventional method (comparative example) and the sensitivity in the high frequency range (the sensitivity at 160 kHz) was higher by 1.5~2.1 dB than in the comparative example and the bias noise was lower by about 1 dB than in the comparative example.

Table 1 also shows that the horizontal position of the array portion 1 is not critical as will be understood from the tests done at the five different positions.

EXAMPLE 2

Magnetic tape was produced according to the method of Example 1 except that one magnet 4 was dispensed with and the array portion 1 was set at the position shown in FIG. 3(d). The magnetic field strength of the magnet was selected in such manner that the field strength at the upper center of the array portion 1 was 400 oe when the array portion 1 was removed. The magnetic tape had the following properties; coercive force Hc: 358 oe, degree of orientation: 2.6, squareness ratio: 0.85, sensitivity at 16 kHz: +1.4 dB, bias noise: −0.8 dB. These properties are inferior to those in Example 1 but superior to in Comparative Example referred to above.

From this experiment, it is seen that a field of more than several hundred oersted is strong enough to magnetize the bars of the array portion 1 to the required extent that magnetic particles in a magnetic coating carried on a support are oriented to provide a magnetic recording medium of a superior quality.

EXAMPLE 3

The array portion 1 used in Example 1 was modified in the following manner. That is, the brass plate was replaced with mild steel plate but the shape and the size were unchanged. A sheet of a plastic material having a thickness of 0.1 mm was laid on the surface of the steel plate. Magnetic bars were not used. The method in Example 1 was followed except for the array portion 1 and the position of FIG. 3(d) was selected for testing in this example. The test results are as follows; coercive force: 365 oe, degree of orientation: 2,8, squareness ratio: 0.86, sensitivity at 16 kHz: +1.7 dB, bias noise: −0.8 dB. These properties are superior to those of the Comparative Example.

From the foregoing, it is understood that the present invention provides a magnetic recording medium of a high quality.

It should be noted that, although the present invention has been described in reference to methods using one or more permanent magnets for magnetizing the array of bars of a soft magnetic material, one or more DC magnets may be equally used.

Further, it was observed that the surface smoothness was improved as well as the aforementioned magnetic properties (the squareness ratio and the degree of orientation). This means that the present invention contributes to the reduction of noise level to and the improvement of the frequency responce.

Further, it should be noted that although the examples were described in connection with a magnetic coating composition containing a solvent, the present invention is also applicable to a process using a non-solvent type coating composition (electron beam curing type, ultraviolet curing type, hot-melting type and the like).

Further, various modifications of the array portion 1 are possible. For example, the array portion may be fabricated by stacking and bonding a plurality of elongated plates and then grinding one surface of the stacked plates to obtain a flat plane in which one side of each plates lie. As there are formed small gaps between the plates, periodically varying magnetic field is formed along the surface of the array portion when it is placed in a magnetic field. Also, round bars, triangular bars or bars of other shapes may be used to form the array portion 1.

What we claim is:

1. A method for manufacturing a magnetic recording medium including the steps of applying a magnetic coating which contains magnetic particles to a support, subjecting said support having the magnetic coating thereon to magnetic orientation treatment while the magnetic coating is still in fluid condition and thereafter drying the magnetic coating, characterized in that said magnetic orientation is effected by passing said support having the undried magnetic coating thereon through a magnetic orientation field generated from magnetic field generating means which comprises permanent or DC magnets and an array of a plurality of parallel elongated members of a soft magnetic material all members of the plurality being spaced from and in a plane between said magnets, said elongated members being arranged in a plane close to said support, said elongated members extending traversely of the direction of movement of said support, there being a gap between all adjacent members, and said members being adapted to be magnetized by said magnets whereby said magnetic elongated members of soft magnetic material modify the magnetic field from said permanent or DC magnets to form a magnetic orientation field having periodic variations at intervals along said support so that said magnetic particles are subjected to alternate magnetic fields as they pass by each of the parallel elongated members so that said particles are alternately oriented vertically with respect to the movement of said support and in the direction of said support as they move through successive alternate magnetic fields.

2. A method for manufacturing a magnetic recording medium according to claim 1, wherein said elongated members have a length longer than the width of the magnetic coating.

3. A method for manufacturing a recording medium according to claim 1 or 2, wherein said plurality of the elongated members are selected from mild steel and soft magnetic ferrite.

4. A method for manufacturing a recording medium according to claim 3, wherein said elongated members are bars having circular, triangular, squares or rectangular cross section.

5. A method for manufacturing a recording medium according to claim 3, wherein said elongated members are prepared by forming a plurality of parallel grooves in one surface of a single plate of a soft magnetic plate.

* * * * *

UNITED STATES PATENT AND TRADEMARK OFFICE
CERTIFICATE OF CORRECTION

PATENT NO. : 4,451,502
DATED : May 29, 1984
INVENTOR(S) : TAKADA ET AL.

It is certified that error appears in the above—identified patent and that said Letters Patent is hereby corrected as shown below:

On the title page Insert
-- [73] Assignee: TDK Corporation, Tokyo, JAPAN --

Signed and Sealed this

Ninth Day of October 1984

[SEAL]

Attest:

*Attesting Officer*

GERALD J. MOSSINGHOFF

*Commissioner of Patents and Trademarks*